United States Patent
Tu et al.

(10) Patent No.: US 8,583,057 B2
(45) Date of Patent: *Nov. 12, 2013

(54) TECHNIQUES TO CONTROL A SHARED ANTENNA ARCHITECTURE FOR MULTIPLE CO-LOCATED RADIO MODULES

(75) Inventors: Jerome C Tu, Saratoga, CA (US); Mike Robinson, Menlo Park, CA (US); James Beninghaus, Campbell, CA (US)

(73) Assignee: Palm, Inc., Sunnyvale, CA (US)

( * ) Notice: Subject to any disclaimer, the term of this patent is extended or adjusted under 35 U.S.C. 154(b) by 398 days.

This patent is subject to a terminal disclaimer.

(21) Appl. No.: 12/901,279

(22) Filed: Oct. 8, 2010

(65) Prior Publication Data

US 2011/0111708 A1 May 12, 2011

Related U.S. Application Data

(63) Continuation-in-part of application No. 12/400,702, filed on Mar. 9, 2009, now Pat. No. 8,260,214, which is a continuation-in-part of application No. 11/555,255, filed on Oct. 31, 2006, now Pat. No. 8,036,683.

(51) Int. Cl.
*H04B 1/46* (2006.01)

(52) U.S. Cl.
USPC .............. 455/82; 455/83; 455/88; 455/553.1; 455/137; 455/552.1; 455/101; 455/132; 455/78; 455/124.4

(58) Field of Classification Search
USPC ......... 455/82, 83, 88, 553.1, 137, 552.1, 101, 455/103, 132, 78, 124.4
See application file for complete search history.

(56) References Cited

U.S. PATENT DOCUMENTS

| | | | | |
|---|---|---|---|---|
| 5,491,472 A | * | 2/1996 | Kurtz | 340/12.22 |
| 6,643,522 B1 | * | 11/2003 | Young | 455/552.1 |
| 6,646,505 B2 | * | 11/2003 | Anderson et al. | 330/124 R |
| 7,873,385 B2 | * | 1/2011 | Boireau et al. | 455/553.1 |
| 8,249,527 B2 | * | 8/2012 | Rybicki | 455/101 |
| 8,284,721 B2 | * | 10/2012 | Chen et al. | 370/329 |
| 2002/0077154 A1 | | 6/2002 | Judson et al. | |
| 2002/0090974 A1 | * | 7/2002 | Hagn | 455/552 |
| 2004/0048577 A1 | * | 3/2004 | Godfrey et al. | 455/67.11 |

FOREIGN PATENT DOCUMENTS

KR 10-2008-0046423 A 5/2008

OTHER PUBLICATIONS

International Search Report and Written Opinion, International Application No. PCT/US2011/055085, Date of Mailing: Feb. 28, 2012, pp. 1-8.

* cited by examiner

*Primary Examiner* — Fayyaz Alam
*Assistant Examiner* — Ganiyu A Hanidu

(57) ABSTRACT

Techniques to control a shared antenna architecture for multiple co-located radio modules is disclosed. For example, a method may comprise receiving power state information for a set of transceivers, receiving activity information for the set of transceivers, and generating control signals for simultaneous operations or mutually-exclusive operations for a shared antenna structure connecting the set of transceivers to an antenna based on the power state information and activity information. Other embodiments are disclosed and claimed.

16 Claims, 8 Drawing Sheets

TECHNIQUES TO CONTROL A SHARED ANTENNA ARCHITECTURE FOR MULTIPLE CO-LOCATED RADIO MODULES

RELATED APPLICATIONS

This application is a continuation-in-part, and claims priority to, the commonly-owned co-pending patent applications U.S. Ser. No. 11/555,255, entitled "COORDINATION AMONG MULTIPLE CO-LOCATED RADIO MODULES," filed Oct. 31, 2006, and U.S. Ser. No. 12/400,702, entitled "SHARED ANTENNA ARCHITECTURE FOR MULTIPLE CO-LOCATED RADIO MODULES," filed Mar. 9, 2009, which are all incorporated herein by reference in their entirety.

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth.

In addition, such devices may have wireless communications capabilities. More particularly, mobile devices may employ various communications technologies to provide features, such as mobile telephony, mobile e-mail access, web browsing, and content (e.g., video and radio) reception. Exemplary wireless communications technologies include cellular, satellite, and mobile data networking technologies.

Furthermore, devices may include multiple radios to handle different wireless technologies. For such a device, the use of multiple radios typically needs multiple antennas, one for each radio. Multiple antennas increase device expenses, as well as consume additional space and resources for a device. Multiple antennas may also cause mutual interference between radios. This may be particularly problematic for devices with smaller form-factors, such as a mobile computing device. As a result, performance degradation may occur. This degradation can impair or even prevent the device performing various communications applications.

DETAILED DESCRIPTION

Figure 1:
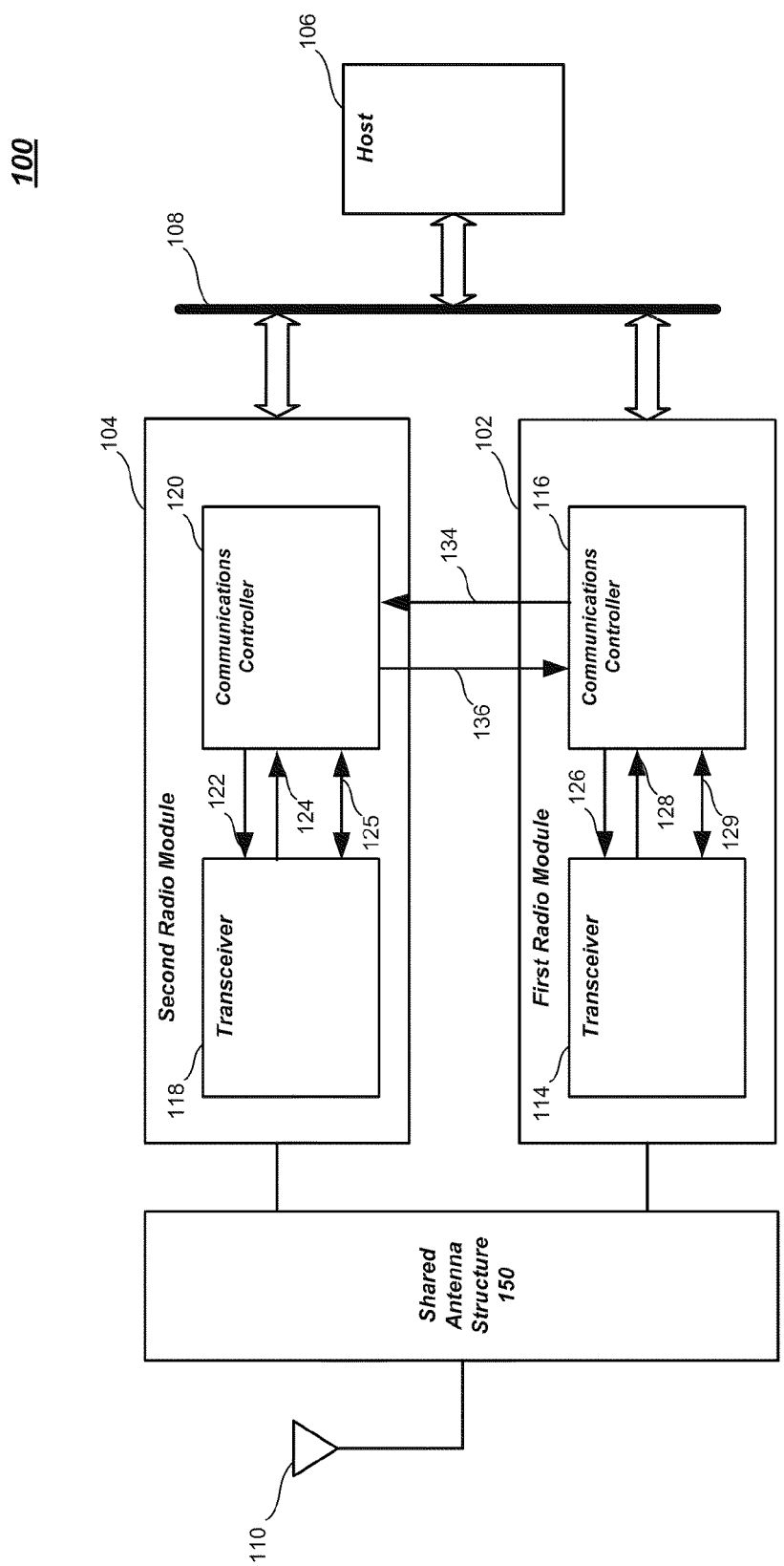
FIG. 1 illustrates one embodiment of a first apparatus.

Various embodiments may be generally directed to techniques for sharing an antenna by multiple radios. Further, various embodiments may be generally directed to coordinating signal transmission and reception activities of multiple radios to enhance sharing of an antenna by multiple radios. These radios may be within a single device, such as a mobile computing device, for example. Thus, such radios are also referred to as co-located radios.

Embodiments may include a mobile computing device, such as a smart phone, having an antenna, a shared antenna structure, and two or more wireless transceivers (or radios). The shared antenna structure may be arranged to allow simultaneous or mutually-exclusive use of the antenna by the two or more wireless transceivers. This provides the advantage of reducing a number of antennas implemented on a single device, particularly those with a smaller form factor, such as a mobile computing device. Furthermore, the shared antenna structure may efficiently use power provided to a mobile computing device, thereby extending battery life for the mobile computing device. As a result, a mobile computing device may be smaller, lighter and operate longer than conventional devices.

The shared antenna structure may use an innovative combination of circuit elements, such as combiners and switches, to enhance co-existence and reduce insertion loss due to the combiners when operating in one or both modes. For instance, when operating in one mode, the shared antenna structure may avoid the use of circuit elements used to provide the other mode, and vice-versa. This potentially avoids inefficiencies associated with the circuit elements used to provide either mode. For example, when operating in a mutually-exclusive mode, the shared antenna structure may avoid the use of one or more combiners used to provide a simultaneous mode. This reduces insertion loss associated with the combiners when the shared antenna structure is used by a single transceiver. In some cases, the insertion loss may be significant, on the order of 3.5 to 4 dB or more. The insertion loss potentially reduces the range and operational performance of the co-located radios. Consequently, reduced insertion loss may result in better power utilization and/or improved quality of wireless signals received by the transceivers. However, when operating in another mode, the shared antenna structure may allow the co-located radios to share a single antenna, thereby allowing each radio to virtually have its own antenna, with the realization that there is a corresponding amount of insertion loss when operating in this mode. Accordingly, the shared antenna structure improves co-existence of co-located radios, while reducing disadvantages associated with conventional antenna sharing techniques.

Operations for the two or more wireless transceivers may be coordinated to improve performance of the shared antenna structure when in either mode. For instance, the apparatus may also include controllers, each controlling wireless communications of a corresponding transceiver. Information may be exchanged with each other, or a central controller, regarding operation of the transceivers. Through the exchange of such information, activity (e.g., transmission and reception of wireless signals) may be coordinated among the transceivers. As a result, the transceivers may share the antenna via the shared antenna structure in a more efficient and effective manner. This may further enhance power utilization and/or improved quality of wireless signals received by the transceivers.

Embodiments of the present invention may involve a variety of wireless communications technologies. These technologies may include cellular and data networking systems. Exemplary data networking systems include wireless local area networks (WLANs), wireless metropolitan area networks (WMANs), and personal area networks (PANs).

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates one embodiment of an apparatus that may communicate across different types of wireless links. In particular, FIG. 1 shows an apparatus 100 comprising various elements. The embodiments, however, are not limited to these depicted elements. FIG. 1 shows that apparatus 100 may include an antenna 110, a shared antenna structure 150, a first radio module 102, a second radio module 104, a host 106, and an interconnection medium 108. These elements may be implemented in hardware, software, firmware, or in any combination thereof.

Although apparatus 100 only shows two radio modules 102, 104, it may be appreciated that apparatus 100 may include more than two radio modules (and associated elements) as desired for a given implementation. Further, although apparatus 100 only shows a single antenna 110, it may be appreciated that apparatus 100 may include additional antennas for sharing with multiple transceivers. This may be desirable, for example, when a mobile computing device implements a wireless diversity scheme that utilizes an antenna array of two or more antennas to improve quality and reliability of a wireless link. An example of a wireless diversity scheme may include a multiple-input multiple-output (or variation thereof) system. In this case, one or both of the radio modules 102, 104 may share one or more antennas from the antenna array via the shared antenna structure 150.

First radio module 102 and second radio module 104 (and/or additional radio modules) may communicate with remote devices across different types of wireless links. For example, first radio module 102 and second radio module 104 may communicate across various data networking links. Examples of such data networking links include wireless local area network (WLAN) links, such as IEEE 802.11 WiFi links. Further examples include wireless metropolitan area (WMAN) links, such as IEEE 802.16 WiMAX links, and personal area networks (PAN) links such as Bluetooth links, Ultra-Wideband (UWB)/WiMedia links, and so forth.

Additionally or alternatively, first radio module 102 and second radio module 104 (and/or additional radio modules) may communicate across wireless links provided by one or more cellular systems. Exemplary cellular systems include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Digital Advanced Mobile Phone Service (IS-136/TDMA), Narrowband Advanced Mobile Phone Service (NAMPS) systems, third generation (3G) systems such as Wide-band CDMA (WCDMA), CDMA-2000, Universal Mobile Telephone System (UMTS), cellular radiotelephone systems compliant with the Third-Generation Partnership Project (3GPP), Long Term Evolution (LTE), and so forth. However, the embodiments are not limited to these examples. For instance, second radio module 104 may additionally or alternatively communicate across non-cellular communications links.

In one embodiment, for example, first radio module 102 is a WiFi device and second radio module 104 is a Bluetooth device. The embodiments, however, are not limited to these examples.

FIG. 1 shows that first radio module 102 includes a transceiver 114 and a communications controller 116. Transceiver 114 may transmit and receive wireless signals through an antenna 110 via shared antenna structure 150. As described above, these signals may be associated with wireless data networks, such as a WiFi link. However, the embodiments are not limited to such.

Communications controller 116 controls the operation of transceiver 114. For instance, communications controller 116 may schedule transmission and reception activity for transceiver 114. Such control and scheduling may be implemented through one or more control directives 126. Control directive(s) 126 may be based on operational status information 128, which communications controller 116 receives from transceiver 114. Also, such control directives may be based on status messages 136 received from radio module 104.

Further, communications controller 116 may perform operations on payload information 129 that it exchanges with transceiver 114. Examples of such operations include error correction encoding and decoding, packet encapsulation, various media access control protocol functions, and so forth.

As shown in FIG. 1, second radio module 104 includes a transceiver 118 and a communications controller 120. Transceiver 118 may also transmit and/or receive wireless signals through antenna 110 via shared antenna structure 150. As described above, these signals may also be associated with wireless data networks, such as a Bluetooth link. However, the embodiments are not limited to such.

Communications controller 120 controls the operation of transceiver 118. This may involve scheduling transmission and reception activity for transceiver 118. Such control and scheduling may be implemented through one or more control directives 122. Control directive(s) 122 may be based on operational status information 124, which communications controller 120 receives from transceiver 118. Also, such control directives may be based on status messages 134 received from radio module 102.

Additionally, communications controller 120 may perform operations on payload information 125 that it exchanges with transceiver 118. Examples of such operations include error correction encoding and decoding, packet encapsulation, various media access control protocol functions, and so forth.

In addition to performing the control operations described above, communications controllers 116, 120 may provide coordination between radio modules 102, 104. This coordination may involve the exchange of information. For instance, FIG. 1 shows that communications controller 116 may send status messages 134 to controller 120. Conversely, communications controller 120 may send status messages 136 to communications controller 116. These messages may be implemented as signals allocated to various signal lines. In such allocations, each message is a signal. However, further embodiments may alternatively employ data messages. Such data messages may be sent across various connections. Exemplary connections include parallel interfaces, serial interfaces, and bus interfaces. Further, as systems on a chip (SoC) develop, the separate communication controllers 116, 120 may in fact be the same piece of silicon or the same core processor. The communication controllers 116, 120 may actually be different function calls or software modules operating on the same chip. In that case, the messages may not use different physical connections such as parallel interfaces, serial interfaces, or bus interfaces. When the functions collapse into one chip, these messages may be passed as message queues, shared via stacks, sent via semaphores or flags, and so forth. The embodiments are not limited in this context.

Host 106 may exchange information with radio modules 102, 104. As shown in FIG. 1, such exchanges may occur across interconnection medium 108. For instance, host 106 may send information to these radio modules for wireless transmission. Conversely, radio modules 102 and 104 may send information to host 106 that was received in wireless transmissions. In addition, host 106 may exchange information with radio modules 102 and 104 regarding their configuration and operation. Examples of such information include control directives sent from host 106 to radio modules 102 and 104.

Furthermore, host 106 may perform operations associated with higher layer protocols and applications. For instance, host 106 may provide various user applications, such as telephony, text messaging, e-mail, web browsing, word processing, video signal display, and so forth. In addition, host 106 may provide one or more functional utilities that are available to various protocols, operations, and/or applications. Examples of such utilities include operating systems, device drivers, user interface functionality, and so forth.

Interconnection medium 108 provides for couplings among elements, such as first radio module 102, second radio module 104, and host 106. Thus, interconnection medium 108 may include, for example, one or more bus interfaces. Exemplary interfaces include Universal Serial Bus (USB) interfaces, Serial Peripheral Interconnect (SPI) interfaces, Secure Digital Input Output (SDIO) interfaces, as well as various computer system bus interfaces. Additionally or alternatively, interconnection medium 108 may include one or more point-to-point connections (e.g., parallel interfaces, serial interfaces, etc.) between various element pairings. In some cases, the host 106 may be in the same physical chip as the communication controllers 116, 120. The interconnection medium 108 may therefore be software rather than a physical interface such as USB, SDIO, SPI, bus, parallel, and so forth. As such cases, the interconnection medium 108 may be implemented as message queues, semaphores, function calls, stack, global variables, pointers, and so forth. The embodiments are not limited in this context.

In general operation, apparatus 100 may engage in communications across multiple wireless links. However, as described above, co-located radios may need to share a single antenna (or antenna array).

In some cases, the co-located radios may need to share antenna 110 at the same time. For example, a user may desire to talk over a cellular voice call while using a Bluetooth headset, and using the internet via WiFi, or a user may desire to stream audio signals from a server over a WiFi link, and listen to the audio signals using a Bluetooth headset. In another example, a user may engage in a Voice Over Internet Protocol (VoIP) using a WiFi link, and communicate using a Bluetooth headset. In yet another example, a user may want to browse the Internet over a cellular data channel while talking on a cellular voice channel. In these cases the user may desire improved performance in a co-existence environment so that multiple radios can work together.

In other cases, the co-located radios may use antenna 110 at different times. For instance, a user may download audio files from a server over a WiFi link, and store them on a mobile computing device. The user may later listen to the stored audio files using a Bluetooth headset. In these cases the operation of the multiple transceivers may not be simultaneous, but rather sequential, so that a user may desire to have improved performance for each one stand-alone.

Conventional solutions for shared front ends are unsatisfactory for a number of reasons. For example, a switched front end offers reduced insertion loss, but performs poorly in a coexistence environment. A splitter front end performs better in the coexistence environment but suffers from permanent insertion loss offered by the splitter. Therefore both solutions provide sub-optimal performance for a mobile computing device.

Apparatus 100 solves these and other problems. In various embodiments, shared antenna structure 150 may be coupled to antenna 110 and control access to antenna 110 by the first radio module 102 and the second radio module 104. The shared antenna structure 150 may include a combiner and at least one switch arranged to allow the first transceiver 114 and the second transceiver 118 to share the antenna for simultaneous operations or mutually-exclusive operations. Simultaneous operations may refer to a mode when both transceivers 114, 118 are active and using antenna 110 at substantially the same time to transmit and/or receive wireless signals. This mode may be referred to as a "simultaneous mode." Mutually-exclusive operations may refer to a mode when one of transceivers 114, 118 is active and using antenna 110 to transmit and/or receive wireless signals. This mode may be referred to as a "mutually-exclusive mode" or "time-division switched mode." The multi-mode arrangement and operation of the shared antenna structure combine the advantages of the switched front end and combiner and/or splitter front end, while reducing the respective disadvantages associated with each solution. Apparatus 100 in general and shared antenna structure 150 in particular may be described in more detail with reference to FIG. 2.

Figure 2:
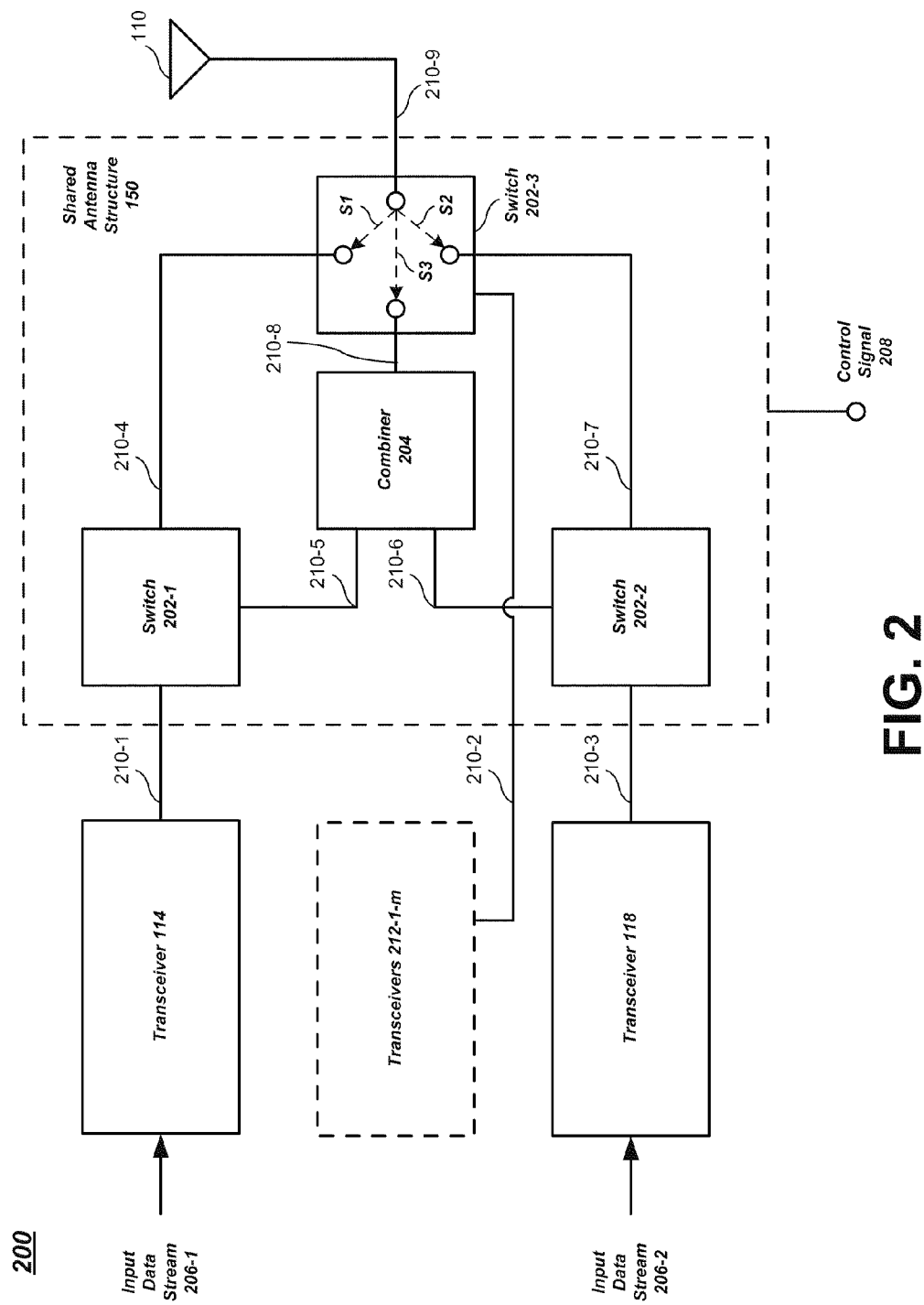
FIG. 2 illustrates one embodiment of a first shared antenna structure.

FIG. 2 illustrates an apparatus 200 having a more detailed block diagram for a first embodiment for the shared antenna structure 150. The shared antenna structure 150 shown in FIG. 2 comprises multiple switches 202-1-$p$ and at least one combiner 204.

The switches 202-1-$p$ may comprise any suitable circuit element capable of changing or switching connections between different input and output signal lines. Examples for the switches 202-1-$p$ may include without limitation a n-way type of switch (e.g., 2-way switch, 3-way switch, 4-way switch, and so forth), a series of successive switches (e.g., 2 single pole double-throw switches), a cross-bar switch connecting multiple inputs to multiple outputs in a matrix manner, and so forth. A particular type of radio-frequency (RF) switch implemented for a given embodiment may vary in accordance with a standard design considerations, including switch insertion, loss a number of inputs (e.g., 1 input) and a number of outputs (e.g., 2 outputs) for the switch, and so forth. The embodiments are not limited to this example.

The combiner 204 may comprise any suitable circuit element capable of combining multiple signals into a single signal in a forward path, or splitting a single signal into multiple signals in a reverse path. The former operation is typically performed by a combiner in a transmit path, while the latter operation is typically performed by a splitter in a receive path. As used herein, the term "combiner" is used to refer to both combining and splitting operations for clarity. In one embodiment, the combiner 204 may comprise a combination combiner/splitter. In other embodiments, however, the combiner 204 may be separated into different circuit elements for performing combining operations and splitting operations, as known to those skilled in the art. Examples for the combiner 204 may include without limitation a passive combiner, a power splitter, a diplexer, a duplexer, a triplexer, a multiplexer, a demultiplexer, and so forth. A particular type of combiner (or splitter) implemented for a given embodiment may vary in accordance with a standard design considerations, including combiner insertion loss, a number of inputs (e.g., 2 input signals) and a number of outputs (e.g., 1 output signal) for the combiner, and so forth. The embodiments are not limited to this example.

In addition to insertion loss, another important characteristic of the combiner 204 is the isolation it offers from one input or output to the other inputs or outputs. In other words, the path loss from an input A to a different input B is quite high. Also, the path loss from an output C to a different output D is quite high. The enhanced isolation characteristics of the combiner 204 enable enhanced simultaneous transmit/transmit operations or transmit/receive operations.

Additionally or alternatively, the combiner 204 may be implemented or replaced with elements such as circulators or an asymmetrical combiner/splitter. For example, an embodiment may place only a 1 dB loss into one path and a 6 dB loss into the other path, instead of a standard 3.5 dB loss symmetrically into each path.

In the illustrated embodiment shown in FIG. 2, a first switch 202-1 may be communicatively coupled to the first transceiver 114. A second switch 202-2 may be communicatively coupled to the second transceiver 118. The combiner 204 may be communicatively coupled to the first and second switches 202-1, 202-2. The combiner 204 may also be communicatively coupled to a third switch 202-3. The third switch 202-3 may be communicatively coupled to the first switch 202-1, the second switch 202-2, and the combiner 204. The third switch 202-3 may also be communicatively coupled to the antenna 110.

In one embodiment, switch 202-3 may be implemented as a 3-way switch having switch positions S1, S2 and S3 to complete different signals paths through the shared antenna structure 150. The different switch positions S1, S2 and S3 may be controlled via one or more control signals 208 received by the shared antenna structure 150 and the switch 202-3.

The shared antenna structure 150 may be arranged to operate in different sharing modes, including a simultaneous mode and a mutually-exclusive mode. In a simultaneous mode, both of the transceivers 114, 118 may utilize the antenna 110 at substantially the same time. In a mutually-exclusive mode, only one of the transceivers 114, 118 may utilize the antenna 110 at any point in time. The shared antenna structure 150 may be placed in a given mode in response to a control signal 208.

When operating in the simultaneous mode, in the transmit path, the transceivers 114, 118 may receive respective input data streams 206-1, 206-2, and process the respective input data streams 206-1, 206-2 for simultaneous transmission over the antenna 110. The switch 202-1 may connect lines 210-1, 210-5, and the switch 202-2 may connect lines 210-3, 210-6. The combiner 204 may combine the signals from lines 210-5, 210-6 to output the combined signal to line 210-8. The switch 202-3 may connect the lines 210-8, 210-9 when the switch 202-3 is set to a switch position S3, thereby allowing the combined data streams 206-1, 206-2 to be simultaneously transmitted over the antenna 110. In the receive path, the signals received by the antenna 110 may follow a reverse path to the respective transceivers 114, 118.

When operating in a mutually-exclusive mode, in the transmit path, the switches 202-1-p may be arranged to allow only one of the transceivers 114, 118 to access the antenna 110 at a given moment in time. For instance, when the transceiver 114 is ready to transmit (or receive), the switch 202-1 may connect lines 210-1, 210-4 and the switch 202-3 may connect lines 210-4, 210-9 when the switch 202-3 is set to a switch position S1. This allows the transceiver 114 to transmit data stream 206-1 over the antenna 110. When the transceiver 118 is ready to transmit (or receive), the switch 202-2 may connect lines 210-3, 210-7, and the switch 202-3 may connect lines 210-7, 210-9 when the switch 202-3 is set to a switch position S2. This allows the transceiver 118 to transmit data stream 206-2 over the antenna 110. The reverse may occur in a receive path for either transceiver 114, 118. It may be appreciated that when in the mutually-exclusive mode, the combiner 204 is removed from the signal path, thereby reducing or eliminating any disadvantages associated with the combiner 204, such as insertion loss.

It is worthy to note that if transceiver 114 implements a Transmit/Receive switch for operation that there will be multiple connections between switch 202-1 and transceiver 114, and connection 210-1 represents only one of multiple connections desired for a given implementation. It is also worthy to note that the Transmit/Receive switch function can then be combined into switch 202-1 for further optimization in reducing insertion loss on both transmit and receive.

As previously described, the shared antenna structure 150 may share the antenna 110 with multiple transceivers 114, 118. The shared antenna structure 150 may also allow any number of additional transceivers to share the antenna 110 as desired for a given implementation. For instance, the apparatus 200 is shown as having one or more additional transceivers 212-1-m connected to switch 202-3, thereby allowing the one or more additional transceivers 212-1-m to use the antenna 110 in a mutually-exclusive mode. The shared antenna structure 150 may form a transmit and/or a receive path between the transceiver 212-1-m and the antenna 110 by having the switch 202-3 connect the lines 210-2, 210-9. It may be appreciated that additional combiners 204 and/or switches 202-1-p may be added to allow the additional transceivers 212-1-m to share the antenna 110 in a simultaneous mode as well. The embodiments are not limited in this context.

Figure 3:
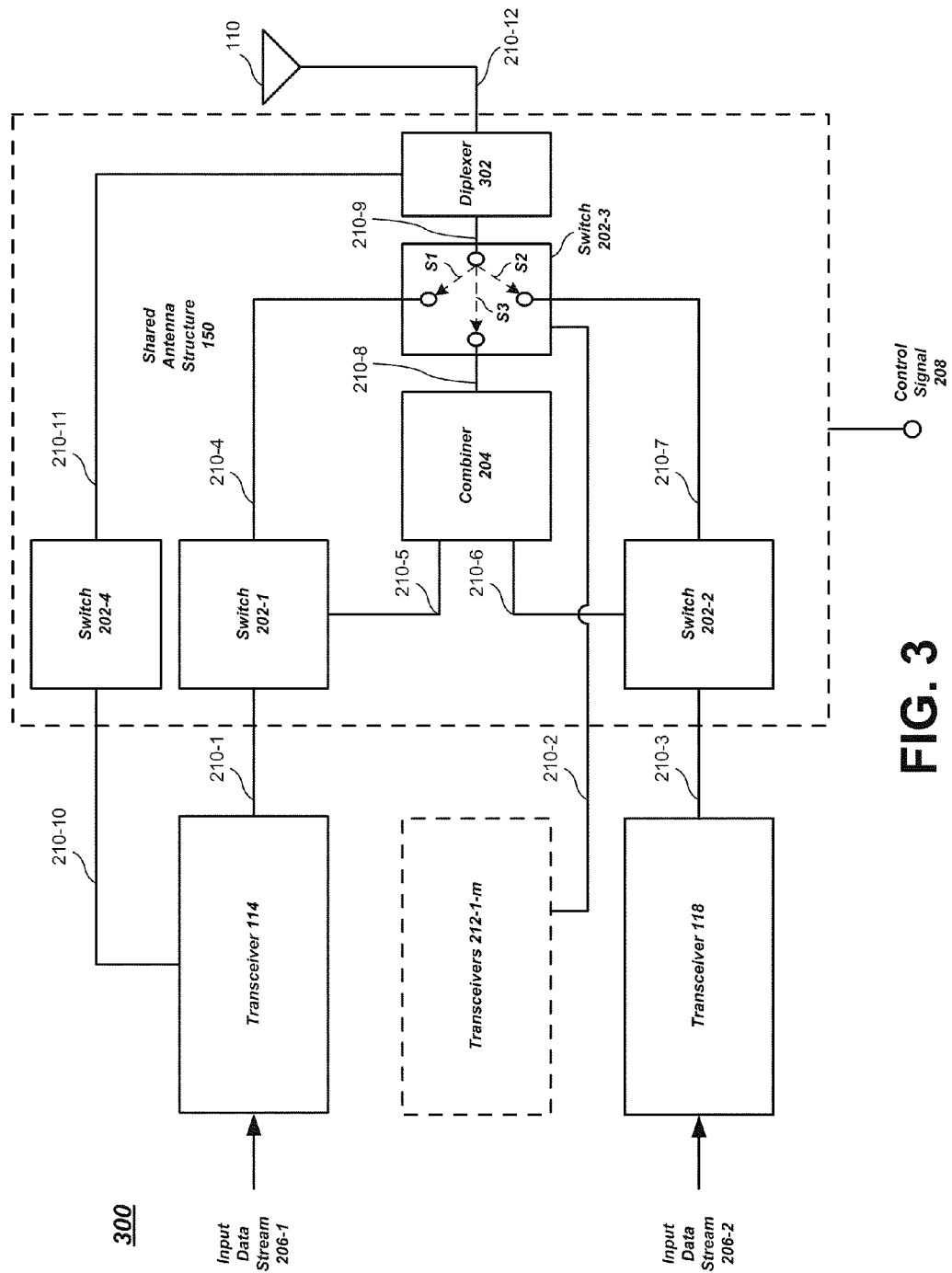
FIG. 3 illustrates one embodiment of a second shared antenna structure.

FIG. 3 illustrates an apparatus 300 having a more detailed block diagram of a second embodiment for the shared antenna structure 150. The shared antenna structure 150 shown in FIG. 3 also comprises multiple switches 202-1-p and at least one combiner 204. The shared antenna structure 150 shown in apparatus 300 may be similar to the shared antenna structure 150 shown in apparatus 200. For instance, the shared antenna structure 150 may comprise the switch 202-1 communicatively coupled to the transceiver 114, the combiner 204 communicatively coupled to the switch 202-1 and the transceiver 118, and the switch 202-3 communicatively coupled to the switch 202-1 and the combiner 204.

Unlike apparatus 200, however, the shared antenna structure 150 of apparatus 300 adds a switch 202-4 communicatively coupled to the transceiver 114 and a diplexer 302. The switch 202-4 controls transmit and receive paths 210-10, 210-11 to the antenna 110 via the diplexer 302. Unlike a double pole cross switch typically implemented for the switch 202-1, the switch 202-4 is a single pole switch that does not change when the shared antenna structure 150 is configured for simultaneous operations or mutually-exclusive operations. The switch 202-4 may be used, for example, whenever the transceiver 114 needs a more direct path to the antenna 110 through the shared antenna structure 150.

The shared antenna structure 150 may be placed in a given mode in response to a control signal 208. For instance, the host 106 may receive activity information for the first transceiver 114 and the second transceiver 118. Examples of such activity information can include, but is not necessarily limited to, such user generated events as initiation of WiFi connection, the start of data-transmission on a WiFi network, initiation of a Bluetooth audio connection, or the termination of any of these connections. The host 106 may send configuration information to a shared antenna structure for the first and second transceivers 114, 118 via control signals 208. The configuration information may be used to arrange the combiner 204 and at least the switch 202-3 for the shared antenna structure 150 for simultaneous operations or mutually-exclusive operations by the shared antenna structure 150.

In one embodiment, a particular configuration for the shared antenna structure 150 may be controlled by control logic for the shared antenna structure 150. The control logic may be implemented by a processor, such as the host 106, the communications controller 116, or the communications controller 120. This logic flow can be evaluated periodically during the operation of the mobile computing device, to adapt the configuration to the user's current needs. Control for the shared antenna structure 150 may be described in more detail with reference to FIGS. 4-6.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

Figure 4:
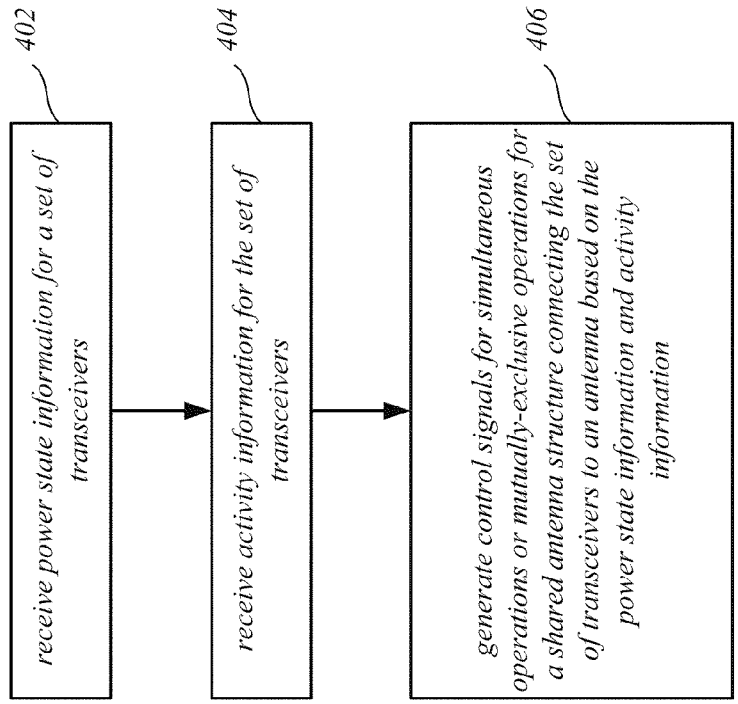
FIG. 4 illustrates one embodiment of a logic flow.

FIG. 4 illustrates one embodiment of a logic flow 400. Logic flow 400 may be representative of the operations executed by one or more embodiments described herein. For example, logic flow 400 may be operations performed by control logic to generate control signals for the shared antenna structure 150.

As shown in FIG. 4, the logic flow 400 may receive power state information for a set of transceivers at block 402. For instance, an antenna control module may receive power state information for a set of transceivers 114, 118. The power state information may indicate whether each of the set of transceivers 114, 118 are in a power-on state or a power-off state. A power-on state may represent a state where one or both of the transceivers 114, 118 are receiving power from a power supply, such as power supply 714 as described with reference to FIG. 7. A power-off state may represent a state where one or both of the transceivers 114, 118 are not receiving power from the power supply 714. The embodiments are not limited in this context.

The logic flow 400 may receive activity information for the set of transceivers at block 404. For instance, an antenna control module may receive activity information for the set of transceivers 114, 118. The activity information may indicate whether each of the set of transceivers 114, 118 are in an active state or idle state. An active state may represent a state where one or both of the transceivers 114, 118 are in a power-on state and operating, such as initiating a connection, communicating information or terminating a connection. An idle state may represent a state where one or both of the transceivers 114, 118 are in a power-on state and not operating, such as when no connections are present. The embodiments are not limited in this context.

The logic flow 400 may generate control signals for simultaneous operations or mutually-exclusive operations for a shared antenna structure connecting the set of transceivers to an antenna based on the power state information and activity information at block 406. For instance, an antenna control module may generate control signals 208 for simultaneous operations or mutually-exclusive operations for the shared antenna structure 150 connecting the set of transceivers 114, 118 to the antenna 110 based on the power state information and activity information. The embodiments are not limited in this context.

Figure 5A:
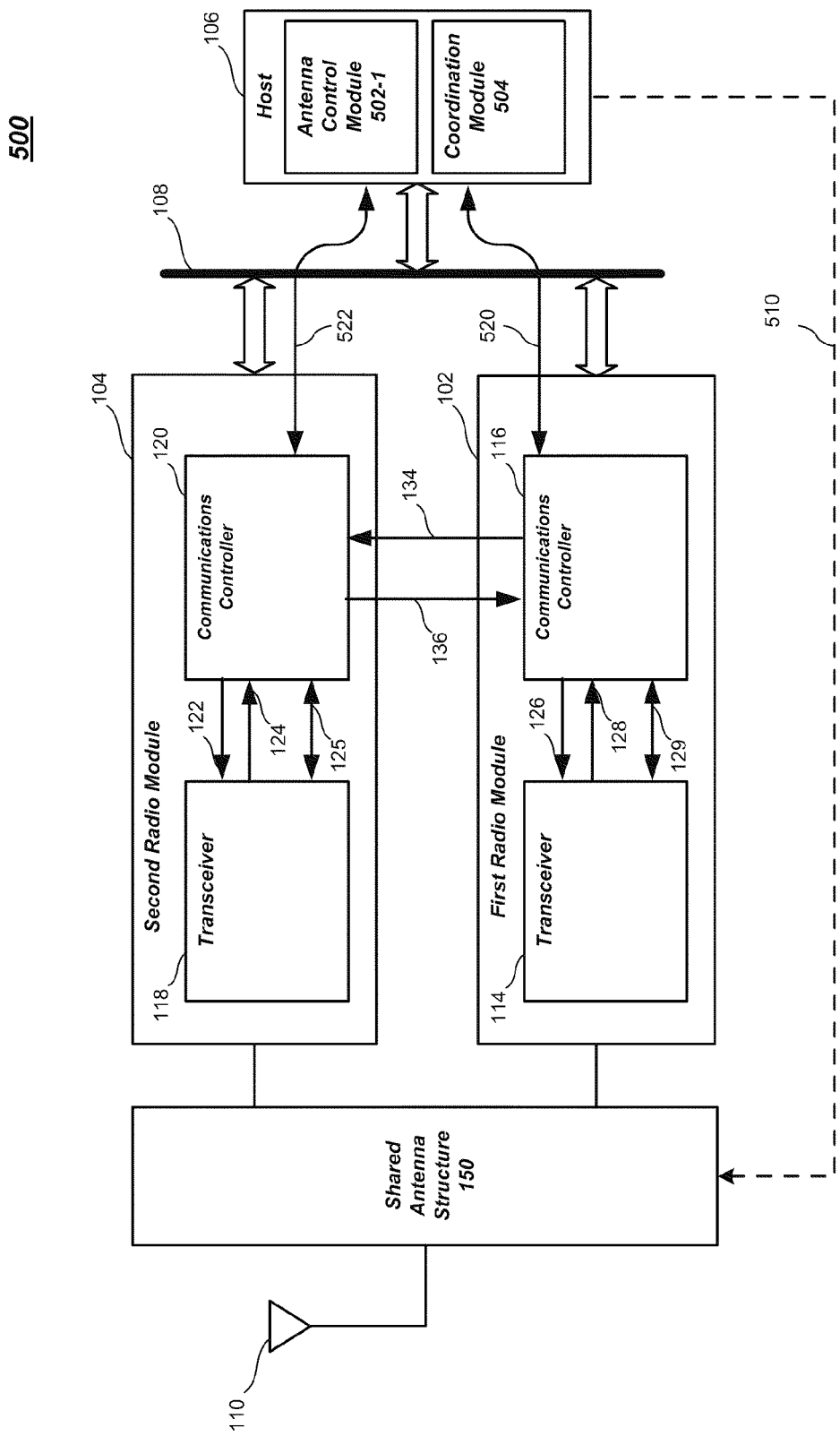
FIG. 5A illustrates one embodiment of a second apparatus.

FIG. 5A illustrates one embodiment of an apparatus 500. The apparatus 500 may be similar to the apparatus 100. In addition, the apparatus 500 may implement one or more antenna control modules 502-1-n and a coordination module 504. The antenna control modules 502-1-n and the coordination module 504 may be implemented in hardware, software, firmware, or in any combination thereof. For instance, features of modules 502-1-n and 504 may be implemented with instructions or logic (e.g., software) that is provided on a storage medium for execution by one or more processors. For such implementations, modules 502-1-n, 504 may each be implemented on a dedicated processor. Alternatively, a processor may be shared among modules 502-1-n and 504 (as well as among other elements). In the illustrated embodiment shown in FIG. 5A, the antenna control module 502-1 and the coordination module 504 are implemented as software or firmware for the host 106. The antenna control module 502-1 (or other antenna control modules 502-2 to 502-n) or the coordination module 504 may be implemented by other processors, such as one or more communications controllers 116, 120, or a dedicated hardware or software controller for the shared antenna structure 150. The embodiments are not limited in this context.

In the illustrated embodiment shown in FIG. 5A, the antenna control module 502-1 may be communicatively coupled to the shared antenna structure 150 either directly or indirectly via radio modules 102, 104. The antenna control module 502-1 may be operative to receive information representing activity for the first and second transceivers 114, 118, and arrange the shared antenna structure 150 for simultaneous operations or mutually-exclusive operations. The antenna control module 502-1 may receive activity information, and generate a control directive or control signal based on the activity information. The antenna control module 502-1 may pass control directives or control signals (e.g., control signals 208) directly to the shared antenna structure 150 via line 510, or indirectly to the shared antenna structure 150 via the radio modules 102, 104 and respective lines 520, 522.

In one embodiment, for example, the antenna control module 502-1 may be operative to receive information representing activity for the transceivers 114, 118, and arrange the shared antenna structure for simultaneous operations when both transceivers 114, 118 have a level of activity above a set of defined thresholds.

In one embodiment, for example, the antenna control module 502-1 may be operative to receive information representing activity for the first and second transceivers 114, 118, and arrange the shared antenna structure 150 for mutually-exclusive operations when one of the first or second transceivers 114, 118 are in an active state, such as when one of the first or second transceivers 114, 118 have a level of activity above a defined threshold, and another of the first or second transceivers 114, 118 are in an idle state, such as when another of the first or second transceivers 1114, 118 have a level of activity below a defined threshold.

In one embodiment, the defined thresholds for the transceivers 114, 118 may be the same. In another embodiment, the defined thresholds may be different thresholds for each radio, such as different parameters, different detection levels, and so forth.

Figure 5B:
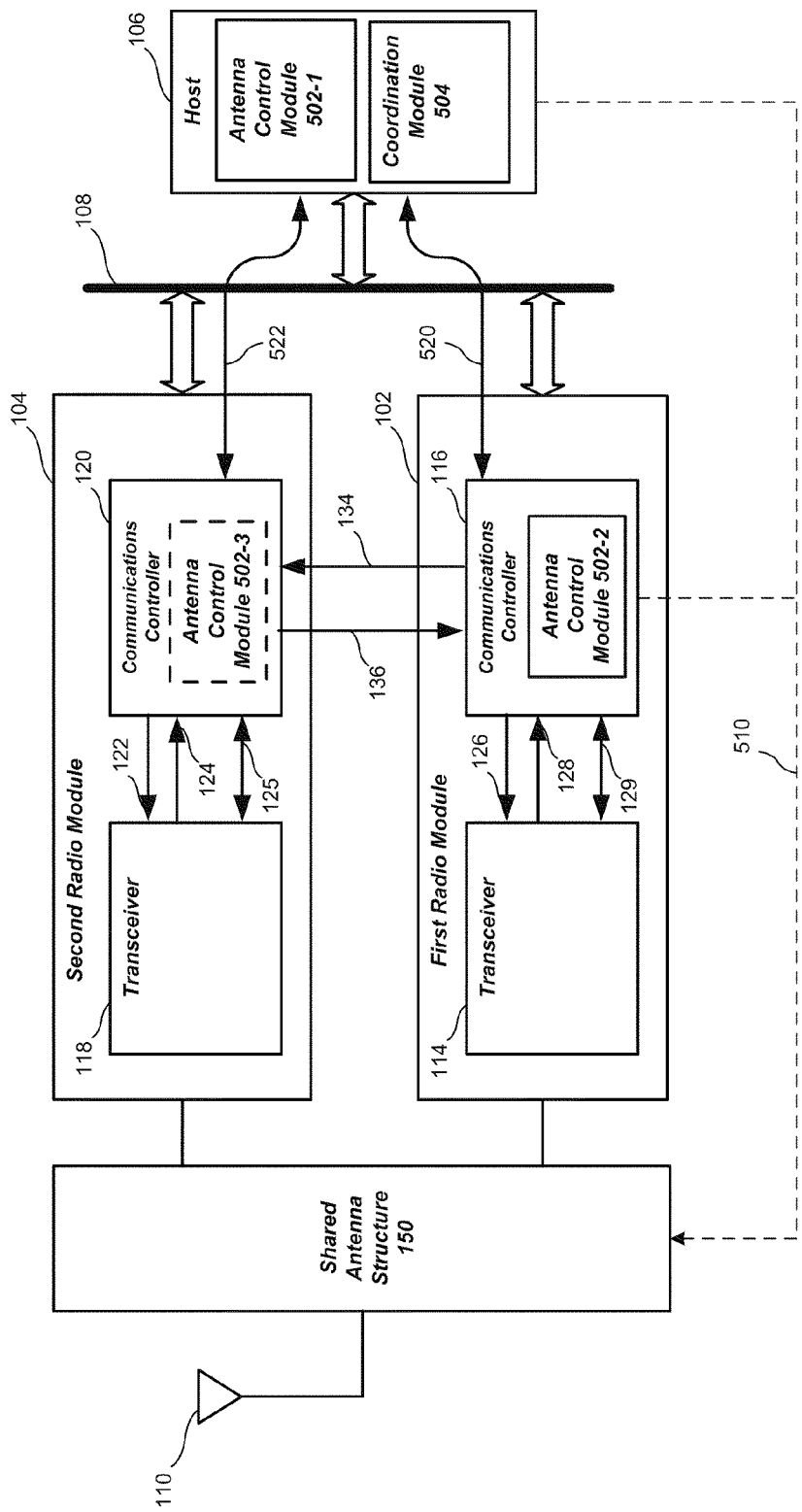
FIG. 5B illustrates one embodiment of a third apparatus.

FIG. 5B illustrates one embodiment of an apparatus 520. The apparatus 520 may be similar to the apparatus 500. However, in addition to the antenna control module 502-1 as implemented by the host 106, the apparatus 520 may implement one or more additional antenna control modules 502-2, 502-3 by the respective communications controllers 116, 120 for the respective transceivers 114, 118.

In various embodiments, the shared antenna structure 150 may be controlled via control signals 208 as generated by the antenna control module 502-1, the antenna control module 502-2, the antenna control module 502-3, or some combination of the antenna control modules 502-1, 502-2 or 502-3. In the latter case, for instance, one of the antenna control modules 502-1, 502-2 or 502-3 may be implemented as a primary controller, and another of the antenna control modules 502-1, 502-2 or 502-3 may be implemented as a secondary controller. The primary and secondary controllers, in various combinations of the antenna control modules 502-1, 502-2 or 502-3, may communicate information between each other to coordinate operations. The antenna control modules 502-2, 502-3 may pass control directives or control signals (e.g., control signals 208) directly to the shared antenna structure 150 via line 510, or indirectly to the shared antenna structure 150 via the radio modules 102, 104 and respective lines 520, 522.

In various embodiments, selection of primary and secondary controllers may vary depending on various characteristics of the mobile computing device 110, such as the power states and activity states of the transceivers 114, 118, for example.

From a high level, the antenna control modules 502-1-$n$ should behave according to the following heuristic:
1. When only one radio is on, switch the combiner out of the path and give exclusive access of the antenna to that single active radio (less insertion loss).
2. When both radios are on, switch the combiner into the path and allow both radios access to the antenna. Each radio would suffer the insertion loss of the combiner during this time.

This heuristic may be summarized in Table 1 as follows:

TABLE 1

| Only Transceiver 114 ON | Only Transceiver 118 ON | Both Transceivers 114, 118 ON |
|---|---|---|
| Combiner 204 is switched out, antenna 110 given to transceiver 114. | Combiner 204 is switched out, antenna 110 given to transceiver 118. | Combiner 204 is switched in to allow simultaneous access to antenna 110. There is a 3.5 dB insertion loss. |

With this heuristic, the antenna control module 502-1 implemented by the host 106 should have control since it has general knowledge of the power-on state of both transceivers 114, 118. However, timing of the antenna control module 502-1 would be relatively coarse, and therefore this embodiment would work well only when the transceivers 114, 118 are in an active state.

The antenna control module 502-1 does know when each of the transceivers 114, 118 is in an active state. For instance, when implemented as a Bluetooth device, the transceiver 118 may be in an active state during a synchronous connection-oriented (SCO) call, advanced audio distribution profile (A2DP) session, personal area network (PAN) session, discovery operations, paging operations, and so forth. During this time, it is important that the transceiver 118 has access to the antenna 110. Similarly, when implemented as a WiFi device, the transceiver 114 may be in an active state when there is active web browsing, email synchronization, a VoIP call, or other data activity on the transceiver 114. When these active states coincide in time, then the combiner 204 needs to be switched in to give optimum co-existence experience. The antenna control module 502-1 implemented by the host 106 may have knowledge of such macroscopic levels of activity and therefore can switch in the combiner 204 when necessary.

However, most of the time neither of the transceivers 114, 118 is in an active state but rather remains in an idle state. When in an idle state, each of the transceivers 114, 118 wakes up only occasionally to listen for traffic or to keep a wireless connection alive. Keeping the combiner 204 in the signal path of both transceivers 114, 118 simply because they are in a power-on state may be inefficient. Both transceivers 114, 118 are penalized with combiner insertion loss even though each transceiver 114, 118 needs the antenna 110 relatively infrequently. Since each of the communications controllers 116, 120 know precisely when they need access to the antenna 110, however, it may be more efficient to give a finer level of real-time control of the switches 502-1-$n$ of the shared antenna structure 150 to one or both of the communications controllers 116, 120.

During idle time, it is not readily apparent which of the transceivers 114, 118 requires the antenna 110 more consistently. Therefore, it is instructive to examine more closely the exact operations of the transceivers 114, 118 when in idle states to evaluate which is the better candidate to control the switches 502-1-$n$ of the shared antenna structure 150 during this time.

With respect to the transceiver 114, a WiFi device is inactive a vast majority of time. Even if WiFi is in a power-on state, it is in unloaded (essentially placed in a power-off state) whenever the host 106 goes into a power saving mode, such as a sleep/suspend mode (e.g., LCD turns off). During this time, the transceiver 114 does not need access to the antenna 110. When the host 106 is "awake" (e.g., LCD is on), then the transceiver 114 goes into an active state to scan for, and associate with, a wireless access point. During this period of time, it needs full access to the antenna 110. Afterwards, the transceiver 114 goes into an idle state listening for beacons every delivery traffic indication message (DTIM) interval.

While scanning, the communications controller 116 of the transceiver 114 is in power save mode most of the time, only waking up each time there is a beacon (e.g., every 100 msec to 300 msec depending on the access point). It receives a beacon and decodes the traffic indication map (TIM) that identifies which stations have data frames waiting for them in a buffer of the access point. If the TIM indicates that there is data, then the communications controller 116 comes out of power save mode, sends a trigger frame or null frame to indicate it is out of power save mode, and begins receiving data in an active state. If no data is detected after a certain time interval (e.g., 10 seconds), then the communications controller 116 goes into an extended power save mode, waking up every 400 msec, for example.

Each beacon typically contains 50 to 150 bytes of data including the following information:
1. Frame header, cyclic redundancy check (CRC);
2. Source and destination MAC addresses, service set identifier (SSID);
3. Time stamp;
4. Supported rates, parameter sets, capability information; and
5. Traffic indication map (TIM).

Assuming a 150 byte frame broadcast using the most robust modulation of 1 Mbps, $$\text{beacon time} = \frac{150 \text{ bytes} \times \frac{8 \text{ bits}}{\text{byte}}}{1,000,000 \text{ bits/sec}} = 1.2 \text{ msec}$$

For 10 seconds, the transceiver 114 needs the antenna 110 for $$\frac{1.2 \text{ msec}}{100 \text{ msec}} = 1.2\% \text{ time.}$$

After 10 seconds, the transceiver 114 needs the antenna 110 for $$\frac{1.2 \text{ msec}}{400 \text{ msec}} = 0.3\% \text{ time.}$$

If the communications controller 116 of the transceiver 114 detects that the received signal strength (RSS) drops below a threshold, it will go into scan mode looking for other access points. This scan can last many seconds and is considered an active state in which the antenna 110 is required constantly.

With respect to the transceiver 118, a Bluetooth device does not enter a power save mode when the host 106 enters a power save mode. The communications controller 120 of the transceiver 118 remains in a power-on state to respond to pages from other Bluetooth devices. If there are on-going asynchronous connectionless links (ACL), it must occasionally send ping packets to maintain the ACL link. All of this activity occurs even when the host 106 is in a power save mode.

A Bluetooth transceiver typically has several categories of activity including:
1. Page: Trying to establish a link with another Bluetooth device by sending page packet with Bluetooth address.
2. Page scan: Waiting to be contacted, scanning for page packets with its own Bluetooth address.
3. Inquiry: Trying to discover other Bluetooth devices— sending a train of inquiry packets.
4. Inquiry scan: Ready to be discovered by other Bluetooth devices—listening for inquiry packets.
5. Active: Actively sending/receiving Bluetooth packets.
6. Sniff: A link is established, but not transferring too much data—only occasional keep-alive packets.
7. Hold: Bluetooth slave temporarily held in a waiting state.
8. Park: Long term suspension of Bluetooth slave in a waiting state.

Of these active states, the ones of most interest for controlling switches 502-1-$n$ of the shared antenna module 150 may include page, inquiry, scans, and sniff, because the mobile computing device 110 will spend the majority of its time in these active states.

With respect to Bluetooth Inquiry and Inquiry Scan modes, when a Bluetooth master wants to discover all Bluetooth devices within range, it goes into an Inquiry mode during which it sends an inquiry packet. A Bluetooth device that is "discoverable" or "visible" is in the Inquiry Scan mode, scanning for inquiry packets. The inquiring device sends 216-channel "trains" of inquiry packets. Each train takes approximately 10 msec. Each train needs to be sent for 2 iterations, and the whole process is repeated 256 times. This entire process may therefore take:

$$10 \text{ msec} \times 2 \text{ trains} \times 2 \text{ iterations} \times 256 = 10.24 \text{ seconds}$$

When operating as the inquiring device, the transceiver 118 needs the antenna 110 for the entire duration, so this is considered an active state. When operating as a discoverable device, the transceiver 118 is in the Inquiry Scan mode in which it listens for inquiry packets for a duration of 11.25 msec (18 timeslots) every 1.28 to 2.56 seconds. It is worthy to note that this active state is only applicable when the user selects "make device visible/discoverable" in the Bluetooth preferences panel. In other situations, the transceiver 118 will not be in Inquiry Scan mode. During Inquiry Scan Mode, the transceiver 118 needs access to the antenna at most <1% of the time:

$$\frac{11.25 \text{ msec}}{1.28 \text{ sec}} = 0.88\%$$

With respect to Bluetooth Page and Page Scan modes, the transceiver 118 connects to other devices by paging them. It sends paging packets containing an identifier of the destination device. It then listens for a response. If no response is heard, the transceiver 118 sends more paging packets (at different frequencies) and listens again. This process continues until a page response is received. This is considered an active state in which the transceiver 118 requires constant access to the antenna 110.

For the majority of the time, the transceiver 118 is in a Page Scan mode. This is an active state when the transceiver 118 is waiting for another peer Bluetooth device to send a Page with its identifier to request the establishment of a connection. For example, this may occur when the mobile computing device 110 is waiting for a car kit to power up and connect to it, waiting for a GPS device to send it location data once a second, and so forth.

The transceiver 118 by default scans for 11.25 msec, and repeats the Page Scan in 1.28 seconds (e.g., R1 Page Scan mode). To save power, it may enter R2 Page Scan mode and scan every 2.56 seconds. During Page Scan mode, the transceiver 118 needs access to the antenna 110 <1% of the time (similar to inquiry scan mode):

$$\frac{11.25 \text{ msec}}{1.28 \text{ sec}} = 0.88\%$$

With respect to Bluetooth Sniff mode, when there is a connection between a Bluetooth master and Bluetooth slave but there is no active session (e.g., SCO, A2DP, PAN, etc), then they can go into one of three low power modes, including Sniff, Hold, and Park. Hold and Park modes are somewhat complex and used infrequently in practice. Therefore, Sniff mode is primarily relevant.

When there is an active connection, the transceiver 118 must be ready to receive packets every other timeslot, which is very power consuming. During Sniff mode, the transceiver 118 can be turned on only during regularly spaced sniff intervals. The two devices can send link management protocol (LMP) supervision packets during these brief active times to keep the link active. During the intervening period, the transceiver 118 can be in low power mode and does not require access to the antenna 110.

The interval between sniff times is negotiated between the master and slave. The interval is typically an unsigned 16-bit number so up to 41 seconds can be allowed between sniffs. In practice the sniff intervals may range from 10 msec to 100 msec to 1 second. For example, the devices may begin in a 10 msec sniff mode. After 10 seconds of no activity, it may go into a 100 msec sniff mode. After 1 minute of no activity, the devices may negotiate to enter into a 1 second sniff mode.

Using an aggressive 125 msec sniff period, the percentage of time the transceiver 118 requires access to the antenna 110 during Sniff mode can be calculated to be about 0.5%:

$$\frac{625 \text{ μsec}}{125 \text{ msec}} = 0.5\%$$

Combining the common Bluetooth idle mode together, such as Page Scan and Sniff mode, every 1.28 seconds the transceiver 118 requires access to antenna 110 for 10.24 sniffs and 1 page scan, which is:

$$\frac{(10.24 \times 625 \text{ μsec}) + 11.25 \text{ msec}}{1.25 \text{ sec}} = 1.34\%$$

As a practical matter, the antenna 110 should by default be given to the transceiver 114, 118 that requires it more often, and then allow the communications controllers 116, 120 of the other transceiver 114, 118 to control the switches 502-1-$n$ to provide access to the antenna 110 when needed. In this case, a determination needs to be made as to which of the communications controllers 116, 120 should be given control of the switches 502-1-$n$ of the shared antenna structure 150.

Upon initial inspection, it appears that the communications controller 116 of the transceiver 114 ought to control the switches 502-1-$n$ because it requires the antenna 110 only 0.3% as compared to 1.3% for the transceiver 118. Factoring in that the communication controller 116 enters power save mode when the host 106 enters power save mode, this favors the communications controller 116 even more. It is reasonable, therefore, to have the default switch configuration in an idle state to bypass the combiner 204 and give the antenna 110 to the transceiver 118 exclusively. Then when the transceiver 114 needs the antenna 110 occasionally, the antenna control module 502-2 implemented by the communications controller 116 can control the switches 502-1-$n$ to give access of the antenna 110 to the transceiver 114, either exclusively or via the combiner 204.

As such, a proposed control algorithm having a set of switch control rules may be created as follows:

1. The antenna control module 502-1 implemented by the host 106 can have coarse control over switches 502-1-$n$ when only one of the transceivers 114, 118 is in a power-on state.
2. The antenna control module 502-1 implemented by the host 106 can control the switches 502-1-$n$ when it knows that both transceivers 114, 118 are in an active state.
3. When both transceivers 114, 118 are in a power-on state but in an idle state (not active), the default configuration is to give the transceiver 118 exclusive access to the antenna 110 with the combiner 204 switched out of the associated signal path.
4. When the transceiver 114 needs the antenna 110, then antenna control module 502-2 implemented by the communications controller 116 can override the setting of the antenna control module 502-1 implemented by the host 106 and pull the antenna 110 to itself. Access to the antenna 110 can be:
   a. Exclusive for the transceiver 114 when the transceiver 118 is in an idle state.
   b. Via the combiner 204 when the transceiver 118 is in an active state such as SCO, A2DP, or PAN modes.
   c. Control can be adjusted via empirical user experience.

The proposed control algorithm is shown in Table 2 as follows:

TABLE 2

| Active state of the transceiver 118 | Active state of the transceiver 114 | Shared antenna structure 150 configuration | Switch 202-3 controlled by: |
|---|---|---|---|
| | Default | Antenna 110 given exclusively to the transceiver 118 with combiner 204 switched out of signal path. | Antenna control module 502-1 |
| Only 1 transceiver 114, 118 in power-on state ||||
| Only transceiver 118 in power-on state | | Antenna 110 given exclusively to transceiver 118 with combiner 204 switched out of signal path. | Antenna control module 502-1 |
| | Only transceiver 114 in power-on state | Antenna 110 given exclusively to transceiver 114 with combiner switched out of signal path. | Antenna control module 502-1 |
| Both transceivers 114, 118 in power-on state ||||
| Transceiver 118 in idle state: No SCO, A2DP, PAN, Inquiry or page | Transceiver 114 in idle state (no data session) | Default = Transceiver 118 Transceiver 114 gets antenna 110 exclusively when needed. | Antenna control module 502-2 overrides Antenna control module 502-1 |
| | Transceiver 114 in active state (data session, scanning) | Transceiver 118 gets antenna 110 via combiner 204 when needed. | Antenna control module 502-2 overrides Antenna control module 502-1 |
| Transceiver 118 in active state: SCO, A2DP, PAN, Inquiry, | Transceiver 114 in idle state (no data session) | Default = Transceiver 118 Transceiver 114 gets antenna 110 via combiner 204 when needed. | Antenna control module 502-2 overrides Antenna control module 502-1 |
| | Transceiver 114 in | Default = Transceiver 118 | Antenna control module |

TABLE 2-continued

| Active state of the transceiver 118 | Active state of the transceiver 114 | Shared antenna structure 150 configuration | Switch 202-3 controlled by: |
|---|---|---|---|
| Page | active state (data session, scanning) | Transceiver 114 gets antenna 110 via combiner 204 when needed. | 502-2 overrides Antenna control module 502-1 |

It may be appreciated that the proposed control algorithm and switch control rules described herein are by way of illustration and not limitation, and may vary according to characteristics of the transceivers 114, 118 for a given implementation. The embodiments are not limited in this context.

In accordance with the proposed control algorithm for the shared antenna structure 150 shown in Table 2, the host 106 may execute the antenna control module 502-2 arranged to receive power state information and activity information for the first and second transceivers 114, 118, and control the shared antenna structure 150 for simultaneous operations or mutually-exclusive operations based on the received power state information and activity information.

In one embodiment, for example, the antenna control module 502-1 may send a control signal 208 to switch the switch 202-3 of the shared antenna structure 150 to a first switch position S1 to form a first signal path between the transceiver 114 and the antenna 110 without the combiner 204 in the first signal path to allow mutually-exclusive operations for the transceiver 114 when the power state information indicates only the transceiver 114 is in a power-on state.

In one embodiment, for example, the antenna control module 502-1 may send a control signal 208 to switch the switch 202-3 to a second switch position S2 to form a second signal path between the transceiver 118 and the antenna 110 without the combiner 204 in the second signal path to allow mutually-exclusive operations for the transceiver 118 when the power state information indicates only the transceiver 118 is in a power-on state.

In one embodiment, for example, the antenna control module 502-1 may send a control signal 208 to switch the switch 202-3 to a third switch position S3 to form a third and fourth signal path between each of the respective transceivers 114, 118 and the antenna 110 with the combiner 204 in the third and fourth signal paths to allow simultaneous operations for the transceivers 114, 118 when the power state information indicates the transceivers 114, 118 are both in a power-on state and the activity information indicates the transceivers 114, 118 are both in an active state.

In one embodiment, for example, the antenna control module 502-2 may replace or override control signals 208 coming from the antenna control module 502-1 to take over control of the shared antenna structure 150. The communications controller 116 may implement the antenna control module 502-2 arranged to control the shared antenna structure 150 for simultaneous operations or mutually-exclusive operations when the power state information indicates the transceivers 114, 118 are both in a power-on state and the activity information indicates the transceivers 114, 118 are both in an idle state.

In one embodiment, for example, the antenna control module 502-2 may send a control signal 208 to switch the switch 202-3 to a first switch position S1 to form a first signal path between the transceiver 114 and the antenna 110 without the combiner 204 in the first signal path to allow mutually-exclusive operations for the transceiver 114 when the activity information indicates only the transceiver 114 is in an active state.

In one embodiment, for example, the antenna control module 502-2 may send a control signal 208 to switch the switch 202-3 to a second switch position S2 to form a second signal path between the transceiver 118 and the antenna 110 without the combiner 204 in the second signal path to allow mutually-exclusive operations for the transceiver 118 when the activity information indicates the transceiver 114 is in an idle state or when the transceiver 118 is in an active state.

In one embodiment, for example, the antenna control module 502-2 may send a control signal 208 to switch the switch 202-3 to a third switch position S3 to form third and fourth signal paths between each of the respective transceivers 114, 118 and the antenna 110 with the combiner 204 in the third and fourth signal paths to allow simultaneous operations for the transceivers 114, 118 when the activity information indicates the transceivers 114, 118 are both in an active state.

Additionally or alternatively, the transceiver 114 may take an alternative path to the antenna 110 that bypasses the switch 202-1, the combiner 204 and the switch 202-3 entirely. In one embodiment, for example, the antenna control module 502-2 may send a control signal 208 to activate the switch 202-4 to form a more direct path to the antenna 110 via signal paths 210-10, 210-11, 210-12 through the diplexer 302. This path may also be used when the transceiver 114 utilizes a different operating frequency, such as a 5 GHz control switch, for example.

In some cases, the transceiver 114 may be arranged to operate at different operating frequencies, such as a 2.4 GHz mode and a 5 GHz mode, for example. The different operating frequencies, and the presence of the switch 202-4, allows the transceivers 114, 118 to both access the antenna 110 via separate paths based on transmit and receive activity of the transceiver 114.

In one embodiment, for example, the first antenna control module 502-1 or the second antenna control module 502-2 may be arranged to send a first control signal 208a to switch the switch 202-3 to the second switch position S2 to form a second signal path between the transceiver 118 and the antenna 110 without the combiner 204 in the second signal path. The first antenna control module 502-1 or the second antenna control module 502-2 may be further arranged to send a second control signal 208b to switch the switch 202-4 to a switch position to form a fifth signal path between the transceiver 114 and the antenna 110 without the combiner 204 in the fifth signal path. This may allow simultaneous operations for the transceivers 114, 118 when the activity information indicates the transceivers 114, 118 are both in an active state.

By way of example, when the transceiver 114 has 5 GHz WiFi transmit activity, the antenna control module 502-2 may send a control signal 208b to the switch 202-4 switching 5 GHz WiFi Tx into the signal path having the diplexer 302, thereby allowing the transceiver 114 to have a direct path to the antenna 110. The antenna control module 502-2 may also send a control signal 208a to switch the switch 202-3 to a second switch position S2 to form a second signal path between the transceiver 118 and the antenna 110 without the combiner 204 in the second signal path, thereby allowing the transceiver 118 to have a direct path to the antenna 110. Similarly, when the transceiver 114 has 5 GHz WiFi receive activity, the antenna control module 502-2 may send a control signal 208b to the switch 202-4 switching 5 GHz WiFi Rx into the signal path having the diplexer 302, thereby allowing the transceiver 114 to have a direct path to the antenna 110. The antenna control module 502-2 may also send a control signal 208a to switch the switch 202-3 to a second switch position S2 to form a second signal path between the transceiver 118 and the antenna 110 without the combiner 204 in the second signal path, thereby allowing the transceiver 118 to have a direct path to the antenna 110. This configuration allows simultaneous operations for the transceivers 114, 118 without using the combiner 204 when one of the transceivers 114, 118 operates using multiple sets of operating frequencies for transmitting and receiving information.

Referring again to FIGS. 1, 5A and 5B, the radio modules 102, 104 may include respective communications controllers 116, 120 communicatively coupled to the respective transceivers 114, 118. The communications controllers 116, 120 may exchange information between their respective transceivers 114, 118. The communications controllers 116, 120 may also be operative to exchange information regarding operation of the transceivers 114, 118, and schedule operations for the transceivers 114, 118 based on the exchanged information. In this case, the communications controllers 116, 120 operate as peer elements. Additionally or alternatively, the communications controllers 116, 120 may be operative to exchange information with the coordination module 504. In this case, the coordination module 504 may operate as a master while the communications controllers 116, 120 operate as slaves to the coordination module 504.

The communications controllers 116, 120 may be implemented in hardware, software, firmware, or in any combination thereof. For instance, features of communications controllers 116, 120 may be implemented with instructions or logic (e.g., software) that is provided on a storage medium for execution by one or more processors. For such implementations, communications controllers 116, 120 may each include a dedicated processor (e.g., a baseband processor). Alternatively, such processors may be shared among controllers 116, 120 (as well as among other elements).

The communications controllers 116, 120 may control activities of a corresponding transceiver 114, 118. This may involve sending one or more directives to the corresponding transceiver. To provide such control, the communications controllers 116, 120 may include various logic, routines, and/or circuitry that operate on information received from other radio modules. In embodiments, one or more processors may execute such logic and routines.

Such control may involve scheduling the corresponding transceiver's transmit and receive activities. This scheduling may involve determining when transmissions should be limited or prohibited. For instance, communications controllers 116, 120 may prohibit its corresponding transceivers 114, 118 from transmitting signals based on information received from the other radio. An example of such information is an indication that another radio is currently receiving transmissions.

In embodiments, communications controllers 116, 120 may receive status data from the corresponding transceivers 114, 118. The status data may include various types of information. For instance, the status data may convey timing information. This may be in the form of clock or synchronization pulses. However, the status data may convey other information as well.

The communications controllers 116, 120 may exchange information with each other. This exchange may involve providing one or more radio modules 102, 104 with operational information. For instance, communications controllers 116, 120 may exchange notifications conveying information regarding the corresponding transceiver's activities or operational status. Status registers may be used to store variables and information regarding such activities or operational status. Based on such notifications, communications controllers 116, 120 may send associated messages or signals to each other. In addition, communications controllers 116, 120 may send control directives to the corresponding transceivers 114, 118 for appropriate action (if any). The communications controllers 116, 120 may employ various techniques to exchange information with each other. For example, the communications controllers 116, 120 may activate and/or detect activated signal lines. Such signal lines may be dedicated to particular signals. Alternatively, communications controllers 116, 120 may generate data messages to be transmitted across various connections. Exemplary connections may include a parallel interface, a serial interface, a bus interface, and/or a data network.

Coordination module 504 may control operations of transceivers 114, 118. This may include scheduling transmission and reception activity for transceivers 114, 118. Such control may be based on operational status of transceivers 114, 118. Control and coordination of transceivers may involve the exchange of information between coordination module 504 and the communication controllers of each radio module 102, 104. For instance, FIG. 5A shows coordination module 504 exchanging information via line 520 with communications controller 116 and information via line 522 with communications controller 120.

This information may include status data sent to coordination module 504. Such status data may originate as operational status information provided by transceivers 114, 118. Further, this information may include commands sent to communications controllers 116, 120. In turn, these communications controllers may forward associated control directives to transceivers 114, 118, respectively. The information may be implemented as signals allocated to various signal lines, data messages, and so forth. This information may be sent across various interconnection medium 108 or alternative connections.

Figure 6:
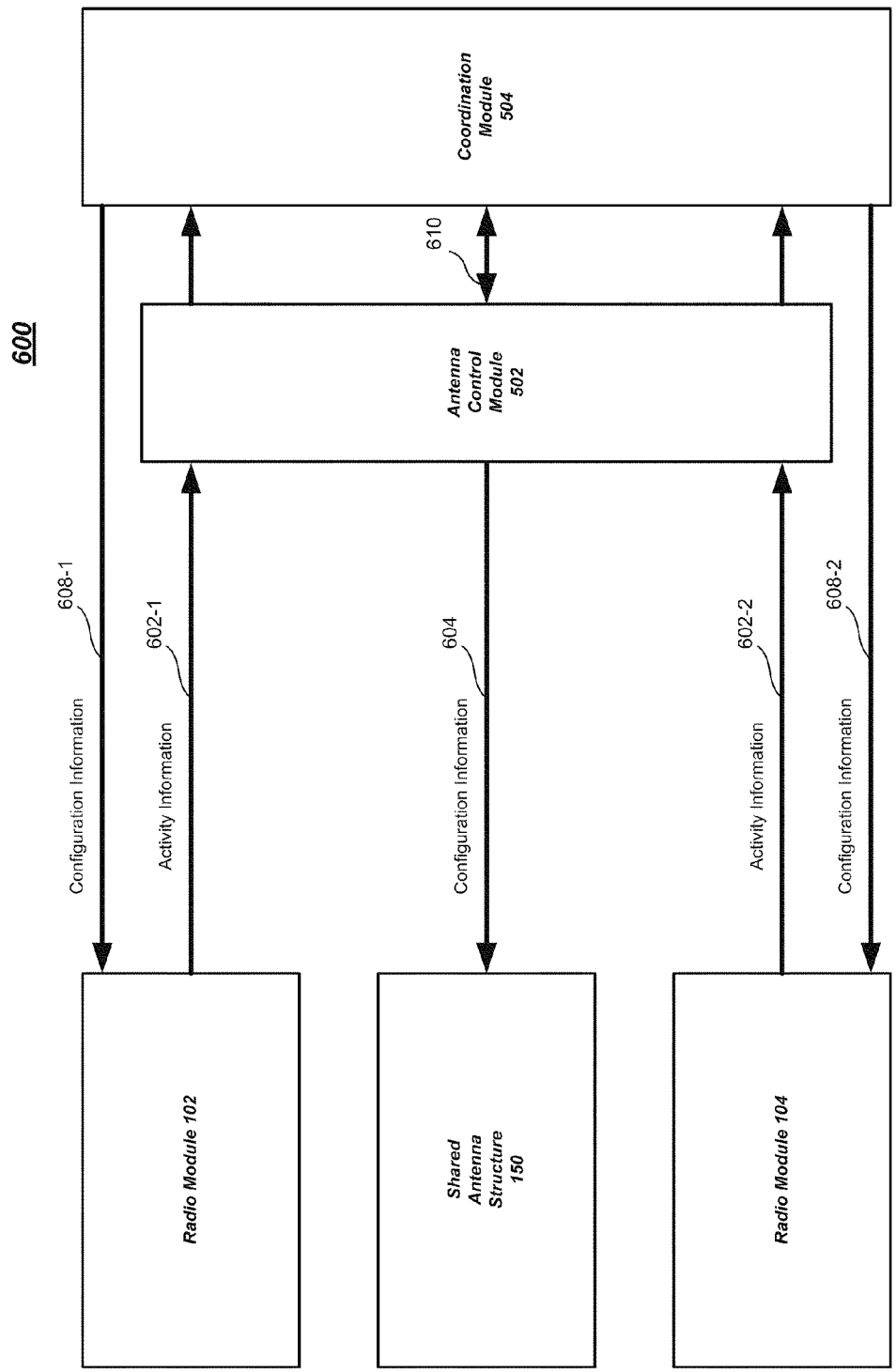
FIG. 6 illustrates one embodiment of an antenna control module.

FIG. 6 is a diagram 600 illustrating exemplary coordination that may be performed by antenna control module 502-1, radio modules 104, 102, and the shared antenna structure 150. As shown in FIG. 6, radio modules 102, 104 may send activity information 602-1, 602-2 to the antenna control module 502-1. Antenna control module 502-1 may generate and send configuration information 604 to the shared antenna structure 150 based on the activity information 602-1, 602-2. The configuration information 604 may indicate whether the shared antenna structure 150 is placed in a simultaneous mode or a mutually-exclusive mode. The configuration information 604 may be in the form of a control signal or message.

Diagram 600 also illustrates exemplary coordination that may be performed by coordination module 504 and the radio modules 102, 104. The coordination module 504 may be operative to receive information regarding operation of the transceivers 114, 118, and schedule operations for the transceivers 114, 118 based on the received information. As shown in FIG. 6, antenna control module 502-1 may forward activity information 602-1, 602-2 to the coordination module 504. Additionally or alternatively, the radio modules 102, 104 may exchange information directly with the coordination module 504 via the lines 520, 522. The coordination module 504 may send coordination information 608-1, 608-2 to the respective radio modules 102, 104 based on the activity information

602-1, 602-2. For instance, coordination module 504 may delay, slow-down, or prevent one or both radio modules 102, 104 from transmitting wireless signals.

The antenna control module 502-1 and the coordination module 504 may also exchange information to affect performance of the radio modules 102, 104 and/or the shared antenna structure 150 via line 610. For instance, the antenna control module 502-1 and the coordination module 504 may exchange information to control how long the shared antenna structure 150 is in a simultaneous mode or a mutually-exclusive mode. Reducing an amount of time the shared antenna structure 150 is in a simultaneous mode reduces an amount of insertion loss caused by the combiner 204 of the antenna control module 150. This may provide a technical advantage under certain conditions.

An exemplary use scenario may include when the shared antenna structure 150 is arranged to operate in a simultaneous mode, but the quality of the wireless signals fall below a desired threshold for one or both transceivers 114, 118. In this case, the coordination module 504 may instruct one of the transceivers 114, 118 to delay or prevent operations, and instruct the antenna control module 502-1 to change the shared antenna structure from the simultaneous mode to a mutually-exclusive mode for one of the transceivers 114, 118. This reduces or obviates the insertion loss associated with the circuit elements providing the simultaneous mode, thereby making more power available to increase range, signal strength or quality. A selection of which of the transceivers 114, 118 to delay or prevent operation may be performed in accordance with any desired criterion, such as assigned priority levels, signal strengths, or quality for the respective transceivers 114, 118.

Another exemplary use scenario may include monitoring a power level for a battery. When a power level for the battery falls below a certain defined threshold, one or both of the transceivers may need to be turned off to conserve power. In this case, the coordination module 504 may instruct one of the transceivers 114, 118 to delay or prevent operations, and instruct the antenna control module 502-1 to change the shared antenna structure from the simultaneous mode to a mutually-exclusive mode for one of the transceivers 114, 118. This reduces or obviates the insertion loss associated with the circuit elements providing the simultaneous mode, thereby extending battery life for a mobile device.

These are merely a few exemplary use scenarios, and it may be appreciated that the antenna control module 502-1 and the coordination module 504 may exchange information and coordinate operations between the radio modules 102, 104 and the shared antenna structure 150 to further enhance performance of a wireless device. The embodiments are not limited to these examples.

As previously discussed with reference to communications controllers 116, 120, some or all of the radio architectures described with reference to FIGS. 1-7 may be implemented on a single chip, such as a system on a chip (SoC). A SoC integrates all components of a computer or other electronic system into a single integrated circuit (chip). It may contain digital, analog, mixed-signal, and radio-frequency functions—all on a single chip substrate. Additionally or alternatively, some or all of the radio architectures as described herein may be implemented as a system in package (SiP). A SiP may comprise a number of chips formed in a single package. When the various functions collapse into a single chip or package, messages may be passed as message queues, shared via stacks, sent via semaphores or flags, and so forth, rather than traditional bus interfaces (e.g., USB, SPI, etc.). The embodiments are not limited in this context.

Figure 7:
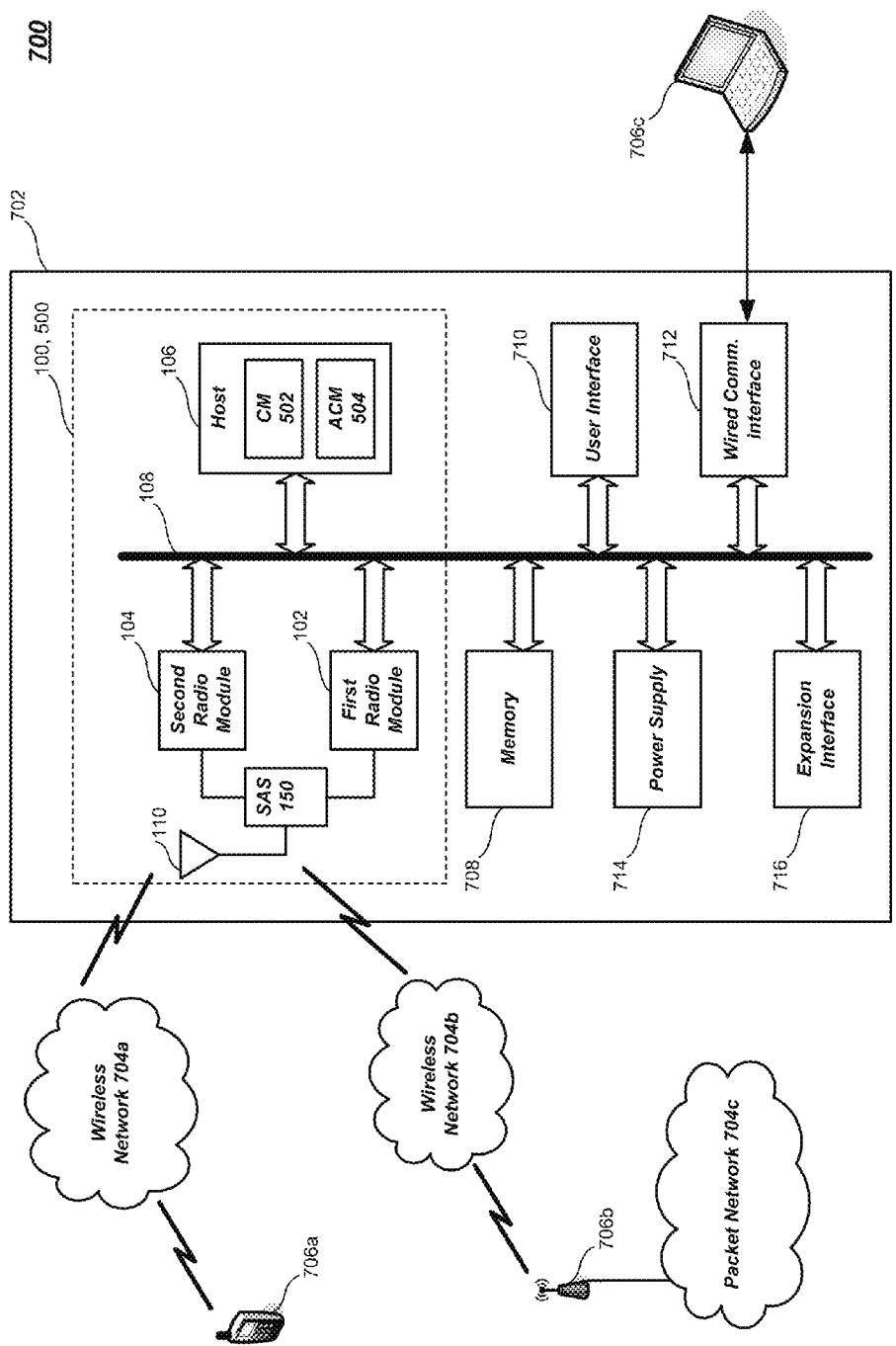
FIG. 7 illustrates one embodiment of a system.

FIG. 7 illustrates an embodiment of a system 700. This system may be suitable for use with one or more embodiments described herein, such as apparatus 100, apparatus 200, apparatus 300, logic flow 400, apparatus 500, diagram 600, and so forth. Accordingly, system 700 may engage in wireless communications across various link types, such as the ones described herein. In addition, system 700 may perform various user applications.

As shown in FIG. 7, system 700 may include a device 702, multiple communications networks 704, and one or more remote devices 706. FIG. 7 shows that device 702 may include the elements of FIG. 1. Additionally or alternatively, device 702 may include the elements of FIG. 5A. In the illustrated embodiment shown in FIG. 7, device 702 may include a memory 708, a user interface 710, a wired communications interface 712, a power supply 714, and an expansion interface 716.

Device 702 may illustrate any wireless device suitable for implementing various embodiments as described herein. The wireless device may comprise a mobile or stationary device. In one embodiment, for example, the device 702 may be implemented as a combination handheld computer and mobile telephone, sometimes referred to as a smart phone. It can be appreciated that the device may comprise a computing device having a handheld form factor. While certain exemplary embodiments may be described with the device 702 implemented as a smart phone by way of example, the device 702 may be implemented as other types of computing devices such as a mobile telephone, a software telephone phone running on a computer, or other suitable computing device having computing and communications capabilities in accordance with the described embodiments. Exemplary computing devices may include a personal computer (PC), desktop PC, notebook PC, laptop computer, smart phone, mobile telephone, personal digital assistant (PDA), combination mobile telephone/PDA, mobile computing device, user equipment (UE), mobile unit, subscriber station, video device, television (TV) device, digital TV (DTV) device, high-definition TV (HDTV) device, media player device, gaming device, messaging device, pager, mobile internet device, tablet computer, netbook computer, or any other suitable communications device in accordance with the described embodiments.

Memory 708 may store information in the form of data. For instance, memory 708 may contain application documents, e-mails, sound files, and/or images in either encoded or unencoded formats. Alternatively or additionally, memory 708 may store control logic, instructions, and/or software components. These software components include instructions that can be executed by one or more processors. Such instructions may provide functionality of one or more elements in system 700. Exemplary elements include host 106, one or more components within radio modules 102 and 104, user interface 710, and/or communications interface 712.

Memory 708 may be implemented using any machine-readable or computer-readable media capable of storing data, including both volatile and non-volatile memory. For example, memory 708 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 708 may be included in other elements of system 700. For instance, some or all of memory 708 may be included on a same integrated circuit or chip with elements of apparatus 100. Alternatively some portion or all of memory 708 may be disposed on an integrated circuit or other medium, for example a hard disk drive, which is external. The embodiments are not limited in this context.

User interface 710 facilitates user interaction with device 702. This interaction may involve the input of information from a user and/or the output of information to a user. Accordingly, user interface 710 may include one or more devices, such as a keyboard (e.g., a full QWERTY keyboard), a keypad, a touch screen, a microphone, and/or an audio speaker. In addition, user interface 710 may include a display to output information and/or render images/video processed by device 702. Exemplary displays include liquid crystal displays (LCDs), plasma displays, and video displays.

Wired communications interface 712 provides for the exchange of information with a device 706c (e.g., a proximate device), such as a personal computer. This exchange of information may be across one or more wired connections. Examples of such connections include USB interfaces, parallel interfaces, and/or serial interfaces. In addition, interface 712 may provide for such exchanges across wireless connections(s). An infrared interface is an example of such a connection. The information exchanged with such proximate devices, may include e-mail, calendar entries, contact information, as well as other information associated with personal information management applications. In addition, such information may include various application files, and content (e.g., audio, image, and/or video).

Wired communications interface 712 may include various components, such as a transceiver and control logic to perform operations according to one or more communications protocols. In addition, communications interface 712 may include input/output (I/O) adapters, physical connectors to connect the I/O adapter with a corresponding communications medium.

FIG. 7 shows that device 702 may communicate across wireless networks 704a and 704b. In particular, FIG. 7 shows communications across network 704a being handled by second radio module 104, and communications across network 704b being handled by first radio module 102. Accordingly, first wireless network 704a may be a cellular network, while second wireless network 704b may be a wireless data network. However, the embodiments are not limited to these examples.

Such wireless communications allow device 702 to communicate with various remote devices. For instance, FIG. 7 shows device 702 engaging in wireless communications (e.g., telephony or messaging) with a mobile device 706a. In addition, FIG. 7 shows device engaging in wireless communications (e.g., WLAN, WMAN, and/or PAN communications) with an access point 706b. In turn access point 706b may provide device 702 with access to further communications resources. For example, FIG. 7 shows access point 706b providing access to a packet network 704c, such as the Internet.

Power supply 714 provides operational power to elements of device 702. Accordingly, power supply 714 may include an interface to an external power source, such as an alternating current (AC) source. Additionally or alternatively, power supply 714 may include a battery. Such a battery may be removable and/or rechargeable. However, the embodiments are not limited to these examples.

Expansion interface 716 may be in the form of an expansion slot, such as a secure digital (SD) slot. Accordingly, expansion interface 716 may accept memory, external radios (e.g., global positioning system (GPS), Bluetooth, WiFi radios, etc.), content, hard drives, and so forth. The embodiments, however, are not limited to SD slots. Other expansion interface or slot technology may include memory stick, compact flash (CF), as well as others.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claim is:

1. An apparatus, comprising:
   an antenna;
   a first radio module having a first transceiver to communicate wirelessly across a first link and a first communications controller to control the first transceiver;
   a second radio module having a second transceiver to communicate wirelessly across a second link and a second communications controller to control the second transceiver;
   a shared antenna structure communicatively coupled to the first radio module, the second radio module and the antenna, the shared antenna structure comprising a combiner and at least one switch arranged to allow the first transceiver and the second transceiver to share the antenna for simultaneous operations or mutually-exclusive operations; and
   a host processor communicatively coupled to the shared antenna structure, the host processor to execute a first antenna control module arranged to receive power state information and activity information for the first and second transceivers, and control the shared antenna structure for simultaneous operations or mutually-exclusive operations based on the power state information and activity information, the power state information to indicate whether a transceiver is in a power-on state or a power-off state and activity information to indicate whether a transceiver is in an active state or idle state;
   wherein the first antenna control module sends a first control signal to switch the at least one switch to a first switch position to form a first and second signal path between each of the respective first and second transceivers and the antenna with the combiner in the first and second signal paths to allow simultaneous operations for the first and second transceivers when the power state information indicates the first and second transceivers are both in the power-on state and the activity information indicates the first and second transceivers are both in the active state.

2. The apparatus of claim 1, wherein the shared antenna structure comprises a first switch communicatively coupled to the first transceiver, a second switch communicatively coupled to the second transceiver, the combiner communicatively coupled to the first and second switches, and a third switch communicatively coupled to the first switch, the second switch and the combiner.

3. The apparatus of claim 1, wherein the shared antenna structure comprises a first switch communicatively coupled to the first transceiver, a second switch communicatively coupled to the second transceiver, the combiner communicatively coupled to the first and second switches, a third switch communicatively coupled to the first switch, the second switch, the combiner and a diplexer, and a fourth switch communicatively coupled to the first transceiver and the diplexer.

4. The apparatus of claim 1, wherein the first antenna control module sends a second control signal to switch the at least one switch to a second switch position to form a third signal path between the first transceiver and the antenna without the combiner in the third signal path to allow mutually-exclusive operations for the first transceiver when the power state information indicates only the first transceiver is in the power-on state.

5. The apparatus of claim 1, wherein the first antenna control module sends a third control signal to switch the at least one switch to a third switch position to form a fourth signal path between the second transceiver and the antenna without the combiner in the fourth signal path to allow mutually-exclusive operations for the second transceiver when the power state information indicates only the second transceiver is in the power-on state.

6. The apparatus of claim 1, wherein the first radio module corresponds to a Wi-Fi device and the second radio module corresponds to a Bluetooth device.

7. An apparatus comprising:
   an antenna;
   a first radio module having a first transceiver to communicate wirelessly across a first link and a first communications controller to control the first transceiver;
   a second radio module having a second transceiver to communicate wirelessly across a second link and a second communications controller to control the second transceiver;
   a shared antenna structure communicatively couple to the first radio module, the second radio module and the antenna, the shared antenna structure comprising a combiner and at least one switch arranged to allow the first transceiver and the second transceiver to share the antenna for simultaneous operations or mutually exclusive operations; and
   a host processor communicatively coupled to the shared antenna structure, the host processor to execute a first antenna control module arranged to receive power state information and activity information for the first and second transceivers, and control the shared antenna structure for simultaneous operations or mutually-exclusive operations based on the power state information and activity information, the power state information to indicate whether a transceiver is in a power-on state or a power-off state and activity information to indicate whether a transceiver is in an active state or idle state;
   wherein the first communications controller comprises a second antenna control module arranged to control the shared antenna structure for simultaneous operations or mutually-exclusive operations rather than the first antenna control module controlling the shared antenna structure when the power state information indicates the first and second transceivers are both in the power-on state;

wherein the second antenna control module sends a first control signal to switch the at least one switch to a first switch position to form first and second signal paths between each of the respective first and second transceivers and the antenna with the combiner in the first and second signal paths to allow simultaneous operations for the first and second transceivers when the activity information indicates the first and second transceivers are both in the active state.

8. The apparatus of claim 7, wherein the second antenna control module sends a second control signal to switch the at least one switch to a second switch position to form a third signal path between the first transceiver and the antenna without the combiner in the third signal path to allow mutually-exclusive operations for the first transceiver when the activity information indicates only the first transceiver is in the active state.

9. The apparatus of claim 7, wherein the second antenna control module sends a third control signal to switch the at least one switch to a third switch position to form a fourth signal path between the second transceiver and the antenna without the combiner in the fourth signal path to allow mutually-exclusive operations for the second transceiver when the activity information indicates the first transceiver is in the idle state.

10. The apparatus of claim 7, wherein the shared antenna structure comprises a first switch communicatively coupled to the first transceiver, a second switch communicatively coupled to the second transceiver, the combiner communicatively coupled to the first and second switches, and a third switch communicatively coupled to the first switch, the second switch and the combiner.

11. The apparatus of claim 7, wherein the shared antenna structure comprises a first switch communicatively coupled to the first transceiver, a second switch communicatively coupled to the second transceiver, the combiner communicatively coupled to the first and second switches, a third switch communicatively coupled to the first switch, the second switch, the combiner and a diplexer, and a fourth switch communicatively coupled to the diplexer.

12. The apparatus of claim 7, wherein the first radio module corresponds to a Wi-Fi device and the second radio module corresponds to a Bluetooth device.

13. A non-transitory computer-readable medium storing instructions that, when executed by a processor, causes the process to:
receive power state information for a set of transceivers, the power state information to indicate whether the set of transceivers are in a power-on state or a power-off state, the set of transceivers including at least a first transceiver and a second transceiver;
receive activity information for the set of transceivers, the activity information to indicate whether the set of transceivers are in an active state or idle state; and
generate control signals for simultaneous operations or mutually-exclusive operations for a shared antenna structure connecting the set of transceivers to an antenna based on the power state information and activity information;
wherein when the power state information indicates the first and second transceivers are both in the power-on state and the activity information indicates the first and second transceivers are both in the active state, sending a first control signal to set a switch to a first switch position to form a first and second signal path between each of respective first and second transceivers and the antenna with a combiner of the shared antenna structure in the first and second signal paths to allow simultaneous operations for the first and second transceivers.

14. The non-transitory computer-readable medium of claim 13, further comprising instructions that cause the processor to, when the power state information indicates only the first transceiver is in the power-on state, send a second control signal to set the switch to a second switch position to form a third signal path between the first transceiver and the antenna without the combiner in the third signal path to allow mutually-exclusive operations for the first transceiver.

15. The non-transitory computer-readable medium of claim 13, further comprising instructions that cause the processor to, when the power state information indicates only the second transceiver is in the power-on state, send a third control signal to set the switch to a third switch position to form a fourth signal path between the second transceiver and the antenna without the combiner in the fourth signal path to allow mutually-exclusive operations for the second transceiver.

16. The non-transitory computer-readable medium of claim 13, wherein the first transceiver corresponds to a Wi-Fi device and the second transceiver corresponds to a Bluetooth device.

* * * * *

UNITED STATES PATENT AND TRADEMARK OFFICE
CERTIFICATE OF CORRECTION

| | | |
|---|---|---|
| PATENT NO. | : 8,583,057 B2 | Page 1 of 1 |
| APPLICATION NO. | : 12/901279 | |
| DATED | : November 12, 2013 | |
| INVENTOR(S) | : Jerome C. Tu et al. | |

It is certified that error appears in the above-identified patent and that said Letters Patent is hereby corrected as shown below:

In the Claims

In column 25, line 33, in Claim 1, delete "apparatus," and insert -- apparatus --, therefor.

In column 26, line 48, in Claim 7, delete "couple" and insert -- coupled --, therefor.

In column 28, line 3, in Claim 13, delete "process" and insert -- processor --, therefor.

Signed and Sealed this
Seventh Day of April, 2015

Michelle K. Lee
*Director of the United States Patent and Trademark Office*